(12) United States Patent
Toyoda et al.

(10) Patent No.: US 8,492,300 B2
(45) Date of Patent: Jul. 23, 2013

(54) INSERT AND CUTTING TOOL

(75) Inventors: Ryoji Toyoda, Niwa-gun (JP); Yusuke Suzuki, Komaki (JP); Yuki Hatano, Kasugai (JP)

(73) Assignee: NGK Spark Plug Co., Ltd., Aichi (JP)

( * ) Notice: Subject to any disclaimer, the term of this patent is extended or adjusted under 35 U.S.C. 154(b) by 978 days.

(21) Appl. No.: 12/532,126

(22) PCT Filed: Mar. 14, 2008

(86) PCT No.: PCT/JP2008/054810
§ 371 (c)(1),
(2), (4) Date: Sep. 18, 2009

(87) PCT Pub. No.: WO2008/114752
PCT Pub. Date: Sep. 25, 2008

(65) Prior Publication Data
US 2010/0040424 A1 Feb. 18, 2010

(30) Foreign Application Priority Data

Mar. 22, 2007 (JP) .................................. 2007-075301
Jun. 12, 2007 (JP) .................................. 2007-155130

(51) Int. Cl.
*C04B 35/587* (2006.01)
*C04B 35/596* (2006.01)
(52) U.S. Cl.
USPC .......................... 501/97.2; 501/97.3; 407/119
(58) Field of Classification Search
USPC .................................. 501/97.2, 97.3; 407/119
See application file for complete search history.

(56) References Cited

U.S. PATENT DOCUMENTS

| 4,892,848 | A | * | 1/1990 | Yoshida et al. ............... 264/665 |
| 5,631,200 | A | | 5/1997 | Ukegawa et al. |
| 5,668,069 | A | | 9/1997 | Sato et al. |
| 5,908,797 | A | | 6/1999 | Urashima et al. |
| 6,784,131 | B2 | * | 8/2004 | Komatsu et al. ............. 501/97.1 |
| 2002/0084103 | A1 | | 7/2002 | Komatsu et al. |

FOREIGN PATENT DOCUMENTS

| DE | 19629074 A1 | 1/1997 |
| EP | 1201623 A2 | 5/2002 |
| JP | 2-275763 A | 11/1990 |
| JP | 7-206409 A | 8/1995 |
| JP | 7-267614 A | 10/1995 |
| JP | 8-503664 A | 4/1996 |
| JP | 08-323509 A | 12/1996 |
| JP | 9-2878 A | 1/1997 |
| JP | 9-030866 A | 2/1997 |
| JP | 09-087037 A | 3/1997 |

(Continued)

*Primary Examiner* — Karl Group
(74) *Attorney, Agent, or Firm* — Sughrue Mion, PLLC

(57) ABSTRACT

An insert includes a silicon nitride sintered body including $\beta\text{-}Si_3N_4$ as a main component, Mg, and a rare-earth element Re (Y, La, Ce, Er, Dy, Yb). A content of Mg in terms of MgO is 1.0-7.0 mol %, a content of Re in terms of an oxide thereof is 0.4-1.0 mol %, and a total content of Mg and Re is from 1.7 to less than 7.5 mol %. The insert has a graded composition in which oxygen content increases from a surface of the sintered body toward an inside thereof such that 0.8-1.5 mass % of oxygen is contained in a region of less than 0.5 mm inside from the surface, 1.1-2.3 mass % of oxygen is contained in a region of 0.5 mm or more inside from the surface, and a difference in oxygen content between the regions is 0.1-1.0 mass %.

7 Claims, 7 Drawing Sheets

FOREIGN PATENT DOCUMENTS

| | | |
|---|---|---|
| JP | 9-183667 A | 7/1997 |
| JP | 10-279360 A | 10/1998 |
| JP | 11-240765 A | 9/1999 |
| JP | 11-268957 A | 10/1999 |
| JP | 2001-172085 A | 6/2001 |
| JP | 2002-012474 A | 1/2002 |
| JP | 2002-201075 A | 7/2002 |
| JP | 2003-313079 A | 11/2003 |
| JP | 3550420 B2 | 8/2004 |
| JP | 2005-255462 A | 9/2005 |
| WO | 9416023 A1 | 7/1994 |

\* cited by examiner

FIG. 3

| | PRIMARY SINTERING CONDITIONS | | | SECONDARY SINTERING | BLENDING COMPOSITION (mass%) | | | | |
|---|---|---|---|---|---|---|---|---|---|
| | TEMPERATURE (°C) | TIME (h) | ATMOSPHERE | | $Re_2O_3$ | $MgCO_3$ | MgO | $ZrO_2$ | $Al_2O_3$ |
| 1 | 1870 | 2 | 2-ATMOSPHERE N2 | HIP | 2.8 | 3 | – | – | – |
| 2 | 1850 | 2 | ATMOSPHERIC N2 | HIP | 1.4 | 3 | – | – | – |
| 3 | 1820 | 2 | 2-ATMOSPHERE N2 | HIP | 2.2 | 0.9 | – | – | – |
| 4 | 1850 | 2 | 2-ATMOSPHERE N2 | HIP | 2 | 2.5 | – | – | – |
| 5 | 1850 | 2 | 2-ATMOSPHERE N2 | HIP | 1.7 | 2.5 | – | 0.3 | – |
| 6 | 1800 | 2 | 2-ATMOSPHERE N2 | HIP | 2 | 1.5 | – | – | 0.4 |
| 7 | 1830 | 2 | 2-ATMOSPHERE N2 | HIP | 1.9 | 2 | – | 0.1 | 0.3 |
| 8 | 1870 | 2 | 2-ATMOSPHERE N2 | HIP | 1.6(Y) | 3 | – | – | – |
| 9 | 1870 | 2 | 2-ATMOSPHERE N2 | HIP | 2.3(La) | 3 | – | – | – |
| 10 | 1870 | 2 | 2-ATMOSPHERE N2 | HIP | 1.2(Ce) | 3 | – | – | – |
| 11 | 1870 | 2 | 2-ATMOSPHERE N2 | HIP | 2.7(Er) | 3 | – | – | – |
| 12 | 1870 | 2 | 2-ATMOSPHERE N2 | HIP | 2.6(Dy) | 3 | – | – | – |
| 13 | 1820 | 2 | 0.7-ATMOSPHERE N2 | HIP | 2.5 | 4.5 | – | – | – |
| 14 | 1870 | 2 | ATMOSPHERIC N2 | HIP | 1.7 | 4.5 | – | – | – |
| 15 | 1870 | 3 | 2-ATMOSPHERE N2 | HIP | 2.8 | 4 | – | – | – |
| 16 | 1870 | 3 | 2-ATMOSPHERE N2 | HIP | 1.7 | 2.5 | – | – | 0.4 |
| 17 | 1870 | 3 | 2-ATMOSPHERE N2 | HIP | 1.7 | 2.5 | – | – | 0.4 |
| 18 | 1870 | 3 | 2-ATMOSPHERE N2 | HIP | 1.4 | 2 | – | – | – |
| 19 | 1870 | 2 | 2-ATMOSPHERE N2 | HIP | 1.9 | 2.5 | – | – | – |
| 20 | 1870 | 2 | 2-ATMOSPHERE N2 | HIP | 1.9 | 2.5 | – | – | – |
| A | 1870 | 2 | 2-ATMOSPHERE N2 | HIP | 3.3 | 3.5 | – | – | – |
| B | 1850 | 2 | ATMOSPHERIC N2 | HIP | 1.1 | 5 | – | – | – |
| C | 1820 | 2 | 0.7-ATMOSPHERE N2 | HIP | 1.7 | 0.5 | – | – | – |
| D | 1870 | 2 | 0.5-ATMOSPHERE N2 | HIP | 1.9 | 1 | – | – | – |
| E | 1820 | 2 | 0.7-ATMOSPHERE N2 | HIP | 2.1 | 1 | 0.5 | – | – |
| H | 1850 | 2 | 2-ATMOSPHERE N2 | HIP | 2.6 | 3 | – | – | – |
| I | 1870 | 3 | 2-ATMOSPHERE N2 | HIP | 2.8 | 4.0 | – | – | – |
| J | 1870 | 3 | 2-ATMOSPHERE N2 | HIP | 1.7 | 2.5 | – | – | 0.4 |
| K | 1870 | 3 | 2-ATMOSPHERE N2 | HIP | 1.4 | 1.5 | – | – | – |
| L | 1870 | 3 | 2-ATMOSPHERE N2 | HIP | 1.7 | 2.5 | – | – | 0.4 |
| M | 1870 | 3 | 2-ATMOSPHERE N2 | HIP | 1.4 | 1.5 | – | – | – |
| N | 1870 | 3 | 2-ATMOSPHERE N2 | HIP | 2.2 | 0.7 | – | – | 0.8 |
| O | 1870 | 3 | 2-ATMOSPHERE N2 | HIP | 0.9 | 0.7 | – | – | – |

* $CeO_2$ was used as a rare-earth element in Sample 10 of the embodiment.

FIG. 4

| | AID COMPONENTS IN SINTERED BODY (mol%) | | | | | OXYGEN CONTENT (mass%) | | | THERMAL CONDUCTIVITY(W/m·K) | | BENDING STRENGTH (MPa) | CRYSTAL PHASE | PEAK INTENSITY RATIO Iyb/Is (%) | WEAR SIZE (mm) | FEED RATE WHEN BREAKAGE OCCURS (mm/rev) |
|---|---|---|---|---|---|---|---|---|---|---|---|---|---|---|---|
| | RARE-EARTH ELEMENT Re₂O₃ | | MgO | TOTAL | ZrO₂ | Al₂O₃ | LESS THAN 0.5 mm | 0.5 mm OR MORE INSIDE | DIFFERENCE | LESS THAN 1 mm FROM SURFACE | 1 mm OR MORE INSIDE | | | | |
| 1 | Yb | 0.9 | 3.4 | 4.3 | — | — | 1.4 | 2 | 0.6 | 60 | 60 | 950 | YbMgSi₂O₅N | 2.1 | 0.8 | 1.4 |
| 2 | Yb | 0.4 | 3.4 | 3.8 | — | — | 0.9 | 1.3 | 0.4 | 55 | 51 | 1000 | YbMgSi₂O₅N | 1.9 | 0.6 | 1.3 |
| 3 | Yb | 0.7 | 1 | 1.7 | — | — | 0.8 | 1.1 | 0.3 | 52 | 44 | 960 | NONE | 0 | 0.5 | 1.2 |
| 4 | Yb | 0.6 | 2.7 | 3.3 | — | — | 1.2 | 1.5 | 0.3 | 50 | 53 | 960 | YbMgSi₂O₅N | 1.5 | 0.8 | 1.5 |
| 5 | Yb | 0.5 | 2.7 | 3.2 | 0.3 | — | 1 | 1.6 | 0.6 | 48 | 43 | 970 | NONE | 0 | 0.6 | 1.3 |
| 6 | Yb | 0.6 | 1.7 | 2.3 | — | 0.6 | 1.4 | 1.6 | 0.2 | 47 | 45 | 910 | NONE | 0 | 0.8 | 1.3 |
| 7 | Yb | 0.6 | 2.4 | 3 | 0.1 | 0.4 | 1.3 | 1.7 | 0.4 | 45 | 41 | 950 | NONE | 0 | 0.8 | 1.4 |
| 8 | Y | 0.9 | 3.4 | 4.3 | — | — | 1.5 | 2 | 0.5 | 50 | 45 | 920 | NONE | 0 | 0.8 | 1.2 |
| 9 | La | 0.9 | 3.4 | 4.3 | — | — | 1.5 | 2 | 0.5 | 48 | 47 | 930 | NONE | 0 | 0.9 | 1.1 |
| 10 | Ce | 0.9 | 3.4 | 4.3 | — | — | 1.6 | 1.9 | 0.3 | 49 | 43 | 900 | NONE | 0 | 1 | 1 |
| 11 | Er | 0.9 | 3.4 | 4.3 | — | — | 1.5 | 1.9 | 0.4 | 48 | 44 | 920 | NONE | 0 | 1 | 1 |
| 12 | Dy | 0.9 | 3.4 | 4.3 | — | — | 1.5 | 1.9 | 0.4 | 50 | 45 | 910 | NONE | 0 | 1 | 1.2 |
| 13 | Yb | 0.8 | 5.1 | 5.9 | — | — | 1.5 | 2.3 | 0.8 | 50 | 43 | 1010 | YbMgSi₂O₅N | 5.3 | 0.7 | 1.5 |
| 14 | Yb | 0.5 | 5.1 | 5.6 | — | — | 1.1 | 1.6 | 0.5 | 51 | 50 | 970 | YbMgSi₂O₅N | 4 | 0.7 | 1.4 |
| 15 | Yb | 0.9 | 5.1 | 6 | — | — | 1.4 | 1.9 | 0.5 | 52 | 48 | 1050 | YbMgSi₂O₅N | 7 | 0.8 | 1.2 |
| 16 | Yb | 0.5 | 3.4 | 3.9 | — | 0.5 | 1.2 | 1.4 | 0.2 | 46 | 41 | 950 | YbMgSi₂O₅N | 2 | 0.6 | 1.3 |
| 17 | Yb | 0.5 | 3.4 | 3.9 | — | 0.5 | 1.2 | 1.4 | 0.2 | 45 | 43 | 950 | YbMgSi₂O₅N | 1.8 | 0.7 | 1.5 |
| 18 | Yb | 0.4 | 1.7 | 2.1 | — | — | 1 | 1.2 | 0.3 | 53 | 50 | 920 | YbMgSi₂O₅N | 1.6 | 0.5 | 1.4 |
| 19 | Yb | 0.6 | 2.7 | 3.3 | — | — | 1.2 | 1.5 | 0.3 | 40 | 37 | 920 | NONE | 0 | 0.8 | 0.8 |
| 20 | Yb | 0.6 | 2.7 | 3.3 | — | — | 1.2 | 1.5 | 0.3 | 46 | 45 | 920 | NONE | 0 | 0.8 | 1 |
| A | Yb | 1.1 | 4.1 | 5.2 | — | — | 1.4 | 2.5 | 1.1 | 50 | 50 | 940 | NONE | 0 | 1.2 | 0.8 |
| B | Yb | 0.3 | 6.8 | 7.1 | — | — | | | | | | UNDENSIFIED | | | | |
| C | Yb | 0.5 | 0.7 | 1.2 | — | — | | | | | | UNDENSIFIED | | | | |
| D | Yb | 0.6 | 1 | 1.6 | — | — | 0.8 | 1 | 0.2 | 61 | 55 | 860 | NONE | 0 | 0.9 | 0.7 |
| E | Yb | 0.7 | 1 | 1.7 | — | — | 0.6 | 1.1 | 0.5 | 52 | 48 | 900 | NONE | 0 | 0.8 | 0.6 |
| H | Yb | 0.9 | 4.4 | 5.3 | — | — | 1.7 | 2 | 0.3 | 46 | 48 | 920 | NONE | 0 | 1.3 | 1.3 |
| I | Yb | 0.9 | 5.1 | 6 | — | — | 1.7 | 1.8 | 0.1 | 50 | 50 | 1000 | NONE | 0 | 1.8 | 0.9 |
| J | Yb | 0.5 | 3.4 | 3.9 | — | 0.5 | 1.2 | 1.2 | 0 | 44 | 42 | 880 | NONE | 0 | 0.9 | 0.8 |
| K | Yb | 0.4 | 1.7 | 2.1 | — | — | 0.9 | 0.9 | 0 | 51 | 50 | 830 | NONE | 0 | 1 | 0.5 |
| L | Yb | 0.5 | 3.4 | 3.9 | — | 0.5 | 1.3 | 1.2 | -0.1 | 44 | 44 | 910 | NONE | 0 | 1 | 0.9 |
| M | Yb | 0.4 | 1.7 | 2.1 | — | — | 1 | 1 | 0 | 53 | 54 | 900 | NONE | 0 | 1.1 | 0.9 |
| N | Yb | 0.7 | 0.7 | 1.4 | — | 1.1 | 1.3 | 1.1 | -0.2 | 42 | 45 | 800 | Yb₂Si₂O₇ | 0 | 0.9 | 0.6 |
| O | Yb | 0.3 | 0.7 | 1 | — | — | | | | | | UNDENSIFIED | | | | |

* CeO₂ was used as a rare-earth element for Sample 10 of the embodiment.

INSERT AND CUTTING TOOL

TECHNICAL FIELD

The present invention relates to an insert and a cutting tool which are required to have wear resistance, and particularly relates to an insert and a cutting tool suitable for cutting cast iron and the like.

BACKGROUND ART

Silicon nitride based sintered bodies (silicon nitride sintered bodies) which have excellent heat resistance, wear resistance, etc. have been used as materials for various types of cutting tools.

However, silicon nitride is difficult to sinter, so usually a sintering aid is used for sintering. Since use of a large amount of the sintering aid deteriorates the performance of a sintered body, the amount of the sintering aid is preferably small within a range of allowing sintering.

Accordingly, various proposals have been presented as in following Patent Documents 1-5 concerning, for example, types of aids and reduction of the use amount of aids, in order to achieve an improved performance.

Patent Document 1 discloses a silicon nitride sintered body for cutting tool which is obtained by using extremely reduced amounts of aids, such as oxides of Mg, Zr and Ce, and thereby has an especially excellent wear resistance.

Patent Document 2 discloses a technique of volatilizing an aid in an outermost surface of a sintered body to reduce an aid amount to less than an aid amount inside to thereby achieve an improved wear resistance.

Patent Document 3 discloses a technique of forming α-sialon in a surface of a silicon nitride sintered body by heat treatment to thereby achieve an increased surface hardness and an improved wear resistance.

Patent Document 4 discloses a technique of sintering in a SiO gas atmosphere to thereby reduce roughness of a sintered surface of a sintered body and form a hard phase having a Vickers hardness of 16 GPa or more from an outermost surface to a depth of 10 μm of the sintered body.

Patent Document 5 discloses a technique of defining rare earths, Mg, Al as grain boundary forming components and a total amount, and thereby improving thermal shock resistance.

Patent Document 1: Japanese Patent No. 3550420
Patent Document 2: Japanese Unexamined Patent Publication No. 2002-12474
Patent Document 3: Japanese Unexamined Patent Publication No. 9-183667
Patent Document 4: Japanese Unexamined Patent Publication No. 8-323509
Patent Document 5: Japanese Unexamined Patent Publication No. 11-268957

DISCLOSURE OF THE INVENTION

Problems to be Solved by the Invention

However, the technique described in Patent Document 1 involves a problem that an obtained material is apt to be unreliable since its breakage resistance is insufficient due to the reduced amounts of the aids, although the wear resistance is excellent.

The technique described in Patent Document 2 involves a problem that, although having a graded composition of a sintering aid, a material has an insufficient wear resistance since $SiO_2$ included in a silicon nitride material as a main component to form a grain boundary phase together with the sintering aid is not at all considered.

The technique described in Patent Document 3 involves a problem that edge strength of a cutting insert is reduced although an improved wear resistance is achieved since the α-sialon formed in the surface of the sintered body has a lower strength than silicon nitride.

The technique described in Patent Document 4 involves a problem that wear resistance during high-speed cutting with a cutting insert is insufficient since improvement of wear resistance is not performed.

The technique described in Patent Document 5 involves a problem that non-graded composition leads to a poor wear resistance, and also a large $Al_2O_3$ content leads to a reduced thermal conductivity and a resulting low breakage resistance.

The present invention, which has been made in view of the above-described problems, has a purpose to provide an insert and a cutting tool which may achieve excellent wear resistance and breakage resistance.

Means for Solving the Problems

An edge temperature of an insert during cutting, which varies depending on an object material and cutting conditions, is said to be generally as high as 800° C. or higher. Accordingly, excellence in heat resistance and chemical stability is important to improve wear resistance.

A grain boundary phase in a silicon nitride sintered body exists as an amorphous glass phase or a crystal phase including an aid component, Si, N, and O. The grain boundary phase has lower heat resistance and corrosion resistance than silicon nitride, and an amount and a composition of the grain boundary phase give influence on heat resistance and chemical stability of the sintered body.

In light of the above, it was first required to reduce the amount of the grain boundary phase which is poor in heat resistance, corrosion resistance and chemical stability.

The inventors of the present invention found that it was possible to improve wear resistance, especially abrasive wear resistance during high speed cutting, by selecting a sintering aid which enables densification with only a small amount, serves as an aid during sintering of silicon nitride, and is easy to move toward a surface and volatilize during sintering, to thereby move a slight amount of an aid component to a vicinity of the surface during a sintering step of silicon nitride and volatilize the aid component, and thus reduce an amount of oxygen from an inside toward the surface. They also found that it was possible to obtain an insert including a silicon nitride sintered body having both wear resistance and breakage resistance by optimizing a composition after volatilization, and thereby completed the present invention.

(1) An invention in a first embodiment provides an insert which includes a silicon nitride sintered body, including β-$Si_3N_4$ as a main component, Mg, and a rare-earth element Re (Y, La, Ce, Er, Dy, Yb). A content of Mg in terms of MgO is 1.0-7.0 mol %, a content of Re in terms of an oxide thereof is 0.4-1.0 mol %, and a total content of Mg and Re is from 1.7 to less than 7.5 mol %. The insert has a graded composition in which oxygen content increases from a surface of the sintered body toward an inside thereof such that 0.8-1.5 mass % of oxygen is contained in a region of less than 0.5 mm inside from the surface, 1.1-2.3 mass % of oxygen is contained in a region of 0.5 mm or more inside from the surface, and a difference in oxygen content between the regions is 0.1-1.0 mass %.

When the content of Mg in terms of MgO is less than 1.0 mol %, the content of the rare-earth element Re (Y, La, Ce, Er, Dy, Yb) in terms of an oxide of Re is less than 0.4 mol %, or the total content is less than 1.7 mol %, a sufficient sinterability cannot be obtained. When these contents exceed respective upper limits, unnecessarily large amounts of aid components remain in the sintered body, which is unfavorable.

Mg is an indispensable element to obtain an intended insert since Mg along with $SiO_2$ lowers a melting point and viscosity of the grain boundary phase, which leads to advantageous effects on sintering, and also Mg and $SiO_2$ in combination are easy to move to a surface portion and volatilize.

The rare-earth element Re (Y, La, Ce, Er, Dy, Yb) is a favorable element to obtain an intended insert since Re not only effectively serves for aciculation of particles of silicon nitride, but also effectively serves for sintering along with Mg due to a small ion radius, and further is easy to move to a surface portion and volatilize.

In the present invention, therefore, a composition of Mg and the rare-earth element Re (Y, La, Ce, Er, Dy, Yb) is defined as described above.

When the oxygen content in the region of less than 0.5 mm inside from the surface of the sintered body is less than 0.8 mass %, an undensified portion, i.e., a so-called white portion, remains, while when the oxygen content is more than 1.5 mass %, sufficient wear resistance cannot be obtained.

When the oxygen content in the region of 0.5 mm or more inside from the surface of the sintered body is less than 1.0 mass %, an acicular structure peculiar to silicon nitride does not develop, and thus sufficient breakage resistance cannot be obtained. When the oxygen content is more than 2.3 mass %, heat resistance is reduced, which leads to a reduced wear resistance particularly during high-speed cutting.

When the difference between the oxygen content in the region of less than 0.5 mm inside from the surface and the oxygen content in the region of 0.5 mm or more inside from the surface is less than 0.1 mass %, the grade is so gentle that it is difficult to achieve wear resistance and breakage resistance at the same time. When the difference is more than 1.0 mass %, residual stress occurs due to a radical difference in oxygen content from that in the surface portion, which is likely to cause an unfavorable peeling breakage in the surface portion.

In the present invention, therefore, the oxygen contents are defined as described above.

According to the insert of the present invention as configured above, excellent wear resistance and breakage resistance can be achieved, and thus high-speeding cutting of cast iron, for example, may be performed.

(2) An invention of a second embodiment has a feature that the rare-earth element Re is Yb, the content of Mg in terms of MgO is 1.0-5.5 mol %, the content of Yb in terms of $Yb_2O_3$ is 0.4-1.0 mol %, and a total content of Mg and Yb is from 1.7 to less than 6.0 mol %.

When the rare-earth element Re is Yb, the resulting combination of Mg and Yb, which effectively serve for sintering with only small amounts and also are easy to volatilize from the surface, is an optimal combination to achieve both of wear resistance and breakage resistance. Accordingly, the composition of Mg and Yb is defined as described above in the present invention.

(3) An invention of a third embodiment has a feature that a thermal conductivity at room temperature is 45 W/m·K or more in an outer region (a surface region) with a depth of less than 1.0 mm from a surface and 40 W/m·K or more in an inner region with a depth of 1.0 mm or more from the surface. The term "room temperature" here means 25° C. (hereinafter the same).

A higher thermal conductivity facilitates heat dissipation and thereby reduces overheat of the insert, and thus is effective for reduction of thermal shock.

According to the present invention, in which the thermal conductivity at room temperature is 45 W/m·K or more in the outer region (the surface region) with a depth of less than 1.0 mm from the surface and 40 W/m·K or more in the inner region with a depth of 1.0 mm or more from the surface, breakage of the silicon nitride sintered body (and thus the insert) due to occurrence and development of a thermal crack may be remarkably suppressed.

(4) An invention of a fourth embodiment has a feature that a bending strength at room temperature is 900 MPa or more.

The insert of the present invention has a bending strength at room temperature (a three-point bending strength: JIS R1601) of 900 MPa or more, and preferably of 1000 MPa or more.

When the insert of the present embodiment is used for cutting, as the strength of the sintered body constituting the insert is higher, not only a simple strength, but also a thermal shock resistance becomes higher, and stable cutting may be achieved. Accordingly, the insert having the above mentioned three-point bending strength is particularly preferable. That is, stable cutting may be achieved by using the insert of the present invention having the strength at room temperature of 900 MPa or more.

When the total content of $ZrO_2$ and $Al_2O_3$, as aid components, is 0.6 mass % or less, the insert of the present invention may maintain the thermal conductivity of 45 W/m·K or more without performance deterioration and achieves an improved sinterability. When the total content of $ZrO_2$ and $Al_2O_3$, as aid components, exceeds 0.6 mass %, movement of the aid components toward the surface is slowed and a sufficiently graded composition cannot be obtained, the wear resistance is reduced, the thermal conductivity is reduced, and breakage resistance is resultantly reduced, which are all undesirable.

(5) An invention of a fifth embodiment has a feature that crystals containing a Yb element, an Mg element, an Si element, an O element, and an N element are included in the grain boundary phase.

By generating crystals containing an Yb element, an Mg element, an Si element, an O element, and an N element in the grain boundary phase constituted by the silicon nitride sintered body, a glass phase existing in the grain boundary phase may be further reduced with only a small amount of added sintering aids, and thus the insert may have extremely excellent wear resistance and breakage resistance. The crystals containing an Yb element, an Mg element, an Si element, an O element, and an N element are not limited to a specific type, but preferably are $YbMgSi_2O_5N$ which may achieve particularly improved wear resistance and breakage resistance of the silicon nitride sintered body when existing in the grain boundary phase.

The insert constituted by the silicon nitride sintered body of the present invention substantially includes a main crystal phase, which contains crystal particles of one or more types of silicon nitride (hereinafter, also referred to as "$Si_3N_4$") and sialon as a main component, and a grain boundary phase, which contains crystals (hereinafter, a compound providing the crystals is also referred to as a "YbMgSi compound") constituted by an Yb element, an Mg element, an Si element, an O element, and an N element.

The main crystal phase contains crystal particles of one or more types of silicon nitride and/or sialon. Silicon nitride contained in the main crystal phase includes $\beta$-$Si_3N_4$ as a main component, and may include only $\beta$-$Si_3N_4$ or a mixture of $\alpha$-$Si_3N_4$ and $\beta$-$Si_3N_4$. In a case where silicon nitride includes a mixture of $\alpha$-$Si_3N_4$ and $\beta$-$Si_3N_4$, a ratio of $\alpha$-$Si_3N_4$, i.e., an $\alpha$ ratio, is preferably 0-30%. When the $\alpha$ ratio exceeds 30%, there may be a disadvantage such as deterioration of mechanical properties, for example, reduction of toughness due to reduction of acicular particles in the sintered body. The $\alpha$ ratio may be calculated from a peak intensity (I$\alpha$) of $\alpha$-$Si_3N_4$ and a peak intensity (I$\beta$) of $\beta$-$Si_3N_4$, which are obtained by an X-ray diffraction method, in accordance with an equation: $[I\alpha/(I\alpha+I\beta)]\times100$.

A content of oxygen as impurities contained in silicon nitride is usually 0.8-2 mass %. A low oxygen content may result in a reduction of sinterability, while a high oxygen content may result in a disadvantage such as a reduction of heat resistance or thermal conductivity. The silicon nitride preferably has an average particle diameter of 0.5-1.6 μm. When the average particle diameter is smaller than 0.5 μm, there may be a disadvantage such as low formability.

Sialon contained in the main crystal phase is a generic term for compounds in Si—Al—O—N systems. An $\alpha$-sialon is a compound with aluminum and oxygen being partially substitutionally soluted at positions of silicon and nitrogen in a crystal of $\alpha$-$Si_3N_4$, and metal ions being interstitially soluted for charge compensation. A $\beta$-sialon is a compound with aluminum and oxygen being partially substitutionally soluted at positions of silicon and nitrogen in a crystal of $\beta$-$Si_3N_4$.

The sialon contained in the main crystal phase is not limited to a particular type, and may be any of an $\alpha$-sialon, a $\beta$-sialon, and a mixture of an $\alpha$-sialon and a $\beta$-sialon. When the sialon is a mixture of an $\alpha$-sialon and a $\beta$-sialon, the ratio of the $\alpha$-sialon, i.e., the $\alpha$ ratio, is preferably less than 30%. When the $\alpha$ ratio exceeds 30%, there may be deterioration of mechanical properties, such as, reduction of toughness due to reduction of acicular particles in the sintered body, resulting in a lower breakage resistance of the silicon nitride sintered body. The $\alpha$ ratio may be calculated from a peak intensity (I$\alpha$) of the $\alpha$-sialon and a peak intensity (I$\beta$) of the $\beta$-sialon which are obtained by the X-ray diffraction method in a same manner as the $\alpha$ ratio in the above case of $Si_3N_4$.

The main crystal phase needs to contain crystal particles of one or more types of silicon nitride and sialon. The main crystal phase may mainly contain crystal particles of silicon nitride, or may mainly contain crystal particles of sialon, or may mainly contain crystal particles of silicon nitride and crystal particles of sialon.

The insert constituted by the silicon nitride sintered body in the present invention includes the main crystal phase, having crystal particles of one or more types of silicon nitride and/or sialon, within a range of 85-98 mass %, and preferably within a range of 90-97 mass %. In the insert, the crystal particles of one or more types of silicon nitride and/or sialon, a YbMgSi compound contained in the later described grain boundary phase, and a compound for forming a crystal phase and/or glassy material, which may be contained in the after-mentioned grain boundary phase, are summed up to 100 mass %. When a content of the main crystal phase exceeds 98 mass %, breakage resistance may be reduced due to a lowered sinterability, while in the case of less than 85 mass %, excellent mechanical properties and heat resistance, which silicon nitride and/or sialon inherently have, cannot be secured sufficiently.

(6) An invention of a sixth embodiment has a feature that an intensity (IYb) of a peak indicating a maximum intensity among peaks based on YbMgSi$_2$O$_5$N in the crystals is more than 0% to equal to 10% or less against an intensity (Is) of a peak indicating a maximum intensity among peaks based on silicon nitride or sialon in an X-ray diffraction chart of the insert of the silicon nitride sintered body.

The intensity (IYb) of the peak indicating the maximum intensity among peaks based on YbMgSi$_2$O$_5$N against the intensity (Is) of the peak indicating the maximum intensity among peaks based on silicon nitride or sialon is more preferably 1-9%, and particularly preferably 1.5-3.0%. When a content of the YbMgSi compound against silicon nitride is within the above range, the insert constituted by the silicon nitride sintered body may achieve particularly excellent wear resistance and breakage resistance, and also may achieve particularly excellent wear resistance even during high-speed cutting at a high temperature of 800° C. or higher. Each of the intensities (IYb) and (Is) of the peaks may be recognized as a height from a baseline in the X-ray diffraction chart of the silicon nitride sintered body.

The YbMgSi compound, which is usually contained in the grain boundary phase, may be partially contained in the main crystal phase.

The grain boundary phase may include a crystal phase and/or a glass phase containing, as main components, elements for constituting a sintering aid or the like in addition to the YbMgSi compound. The crystal phase and/or the glass phase are/is generated when the sintering aid, silicon nitride, and silica components or the like contained in the silicon nitride as impurities, are turned into a liquid phase during sintering, contribute to sintering, and then are solidified during cooling. The crystal phase, such as a YAG phase, a YAM phase, Yb$_2$Si$_2$O$_7$, etc., is controlled to an appropriate abundance (mass %) due to its usually low toughness.

The glass phase is controlled to an appropriate abundance (mass %) considering sinterability during forming a sintered body in view of its usually low melting point, low toughness, and low hardness. The abundances of the crystal phase and the glass phase, which are appropriately adjusted depending on the silicon nitride sintered body, the YbMgSi compound, and the like, should be as small as possible or should desirably be substantially zero.

(7) An invention of a seventh embodiment is a cutting tool including a holder and the insert, which is described in any one of the first to sixth embodiments, attached to the holder.

Cutting may be performed in a desirable manner by using the cutting tool including the insert attached to the holder. In this case, it is preferable to use MgCO$_3$ material powder as an Mg source to manufacture the above described silicon nitride sintered body (and thus the insert).

It is usual to use MgO powder as a material for a silicon nitride sintered body. In this case, however, an undensified portion, i.e., a so-called white portion, may be generated due to excessive volatilization in the surface in the silicon nitride sintered body of the present invention, in which the aid components are volatilized from the surface, unless atmosphere control is appropriately performed.

When MgCO$_3$ is used as a starting material, MgCO$_3$ decomposes at relatively low temperatures during sintering to generate CO$_2$ (MgCO$_3$→MgO+CO$_2$↑) in a nitrogen atmosphere. This may suppress excessive volatilization of the aid components from the surface, and thus a silicon nitride sintered body having a stabilized surface without a white portion may be manufactured.

BRIEF DESCRIPTION OF THE DRAWINGS

FIG. 3 is an explanatory view showing Table 1 containing sintering conditions and blending compositions of samples in an experimental example.

FIG. 4 is an explanatory view showing Table 2 containing experimental results.

EXPLANATION OF REFERENCE NUMERALS

Figure 1A:
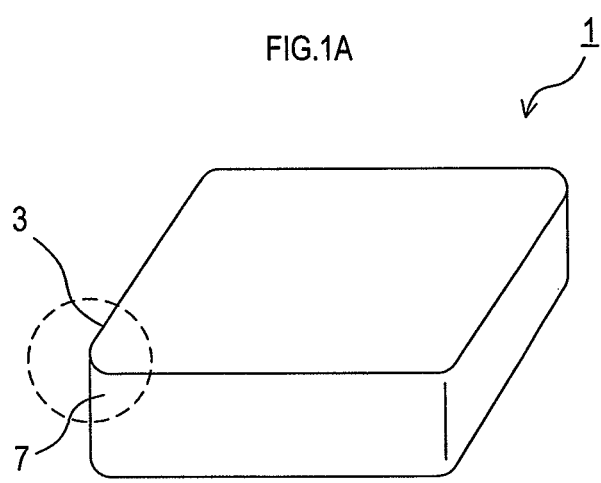
FIG. 1A is a perspective view of an insert in an embodiment and FIG. 1B is an enlarged perspective view showing a nose portion of the insert.

1 . . . insert
3 . . . cutting edge
5 . . . chamfer
7 . . . nose
9 . . . holder
11 . . . cutting tool

BEST MODE FOR CARRYING OUT THE INVENTION

An embodiment of the present invention will be explained hereinafter with reference to the drawings.

Embodiment a) First, an insert according to the present embodiment will be described.

Figure 1B:
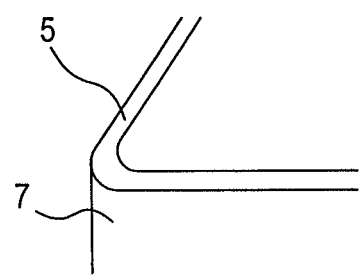

As shown in FIGS. 1A-1B, an insert 1 according to the present embodiment is a cutting tip made of silicon nitride sintered body having a substantially square plate-like shape (as defined in ISO standards SNGN120408).

The insert 1 includes a cutting edge 3 at a periphery on each face (each rake face) thereof, and a chamfer 5 is formed in the cutting edge 3. A nose 7 of the insert 1 is smoothly curved.

The insert 1 of the present embodiment includes Mg and a rare earth element Re (Y, La, Ce, Er, Dy, Yb). A content of Mg in terms of MgO is 1.0-7.0 mol %, a content of Re in terms of an oxide thereof is 0.4-1.0 mol %, and a total content of Mg and Re is 1.7 to 7.5 mol %.

Also, the insert 1 has a graded composition in which oxygen content increases from a surface of the sintered body toward an inside thereof such that 0.8-1.5 mass % of oxygen is contained in a region of less than 0.5 mm inside from the surface, 1.1-2.3 mass % of oxygen is contained in a region of 0.5 mm or more inside from the surface, and a difference in oxygen content between the regions is 0.1-1.0 mass %.

Further, the insert 1 has a thermal conductivity of 45 W/m·K or more at room temperature, and 40 W/m·K or more in an inner region with a depth of 1.0 mm or more from a surface. The insert 1 has a bending strength at room temperature (a three-point bending strength: JIS R1601) of 900 MPa or more.

The insert 1 is constituted by a silicon nitride sintered body including crystals containing a Yb element, an Mg element, an Si element, an O element, and an N element in a grain boundary phase.

Further, in the insert 1, an intensity (IYb) of a peak indicating a maximum intensity among peaks based on $YbMgSi_2O_5N$ is more than 0% to less than 10% equal to 10% or less against an intensity (Is) of a peak indicating a maximum intensity among peaks based on silicon nitride or sialon in an X-ray diffraction chart.

Accordingly, the insert 1 in the present embodiment configured as described above has both high wear resistance and high breakage resistance as shown in a later described experimental example.

Figure 2:
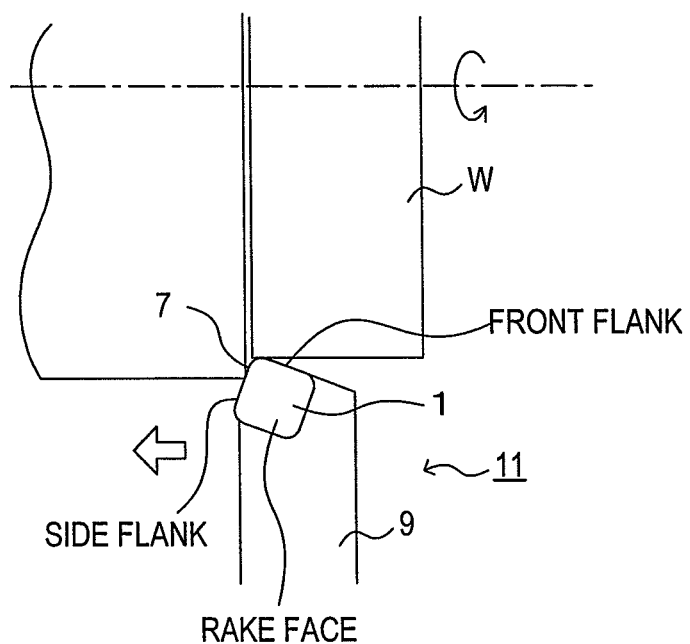
FIG. 2 is an explanatory view showing a manner of cutting.

As exemplarily shown in FIG. 2, the above described insert 1 is joined, for example, to a top end of a columnar steel holder 9 to be used as a cutting tool 11.

For example, cutting work using the insert 1 is performed by pressing a nose 7 between a front flank and a side flank against a rotating work W.

b) A manufacturing method of the insert according to the present embodiment will next be described.

First, $\alpha$-$Si_3N_4$ powder having an average particle diameter of 1.0 μm or less as a main component and $Yb_2O_3$ powder, $Y_2O_3$ powder, $La_2O_3$ powder, $CeO_2$ powder, $Er_2O_3$ powder, $Dy_2O_3$ powder, MgO powder, $MgCO_3$ powder, $Al_2O_3$ powder, $ZrO_2$ powder, each having an average particle diameter of 1.0 μm or less as sintering aids were weighed with blending ratios shown in FIG. 3 (Table 1).

The weighed materials were mixed with ethanol or water solvent for 96 hours using a pot with a silicon nitride inner wall and silicon nitride balls in order to minimize $Al_2O_3$ contamination, and a slurry was obtained.

The slurry was sieved through a 325 mesh sieve and 5.0 mass % of a wax-type organic binder dissolved in ethanol or water was added, and then the slurry was spray-dried.

The obtained granulated powder was pressed into a shape as defined in ISO standards SNGN120408, and then degreasing was performed at 600° C. for 60 minutes in nitrogen atmosphere of 1 atmospheric pressure in a heater.

Subsequently, a primary sintering of the degreased compact was performed. Specifically, the compact was set in a SiC crucible or a silicon nitride crucible, and was held at 1,800-1,900° C. at an atmospheric pressure (an atmospheric pressure of each of Samples 1-20) indicated in FIG. 3 (Table 1) for 60-180 minutes in a first stage, and then was held at a temperature (1,800° C. or lower) lower than in the first stage at an atmospheric pressure equal to or less than an atmospheric pressure for 120-360 minutes in a second stage, in order to achieve sintering.

The obtained silicon nitride sintered body was ground into a shape as defined in ISO standards SNGN120408 to obtain the insert 1 in the present embodiment, i.e., inserts (Samples 1-20) of examples within the scope of the present invention which were to be used in a later described experiment.

In the present embodiment, as described above, the materials (especially $MgCO_3$) with the above-mentioned blending composition is used and the primary sintering is performed at a low pressure of 2 atmospheric pressure or lower. Accordingly, it is possible to obtain the insert 1 having the above mentioned configuration and exhibiting excellent properties.

Inserts of comparative examples (Samples A-O) beyond the scope of the present invention were also prepared in a same manner (note that conditions indicated in FIG. 3 (Table 1) were employed.).

Experimental Example

Next, an experimental example performed by using samples will be described.

a) First, an explanation will be provided on methods of measuring properties or the like of sample inserts.

Contents of respective elements (excluding non-metal elements, hereinafter the same) in respective samples (sintered body) were analyzed by a known fluorescent X-ray or chemical analysis, or the like, and a mass ratio was calculated by regarding each of the elements as a chemical compound of an oxide or nitride, e.g., $Si_3N_4$ for Si, MgO for Mg, or $YbO_3$ for Yb.

In after-mentioned FIG. 4 (Table 2), aid components in each sintered body are indicated with values in mol %. By multiplying the values in mol % by molecular weights of the respective components so as to adjust the total percentage of the sintered body to be 100%, converted values in mass % may be obtained.

Oxygen contents were measured by cutting each of the samples at a position of 0.5 mm from its surface, separately crushing a surface side region and an inside region on both sides of the position of 0.5 mm, performing impulse heating and melting, and using a non-dispersive infrared method.

Thermal conductivity was measured by grinding each of the samples into a disk having a diameter of 10 mm and a thickness of 1-2 mm, and by using a method described in JIS R1611 (a so-called laser flash method) at room temperature. Specifically, a thermal conductivity of up to 1 mm from the surface was measured by using a sample having a thickness of 1 mm, while a thermal conductivity of 1 mm or more inside from the surface was measured by using a sample having a thickness of 2 mm.

Strength was measured by preparing each of the samples having a size of 3 mm (length)×4 mm (width)×36 mm or more (height), grinding the sample, and performing a three-point bend test at room temperature according to JIS R1601 five or more times to obtain an average value. A span during the test, which is preferably 30 mm, may be less than 30 mm (lower limit: 10 mm).

X-ray diffraction was performed on each of the samples within a range of $2\theta=20$-$70°$ using an X-ray diffractometer produced by Rigaku Denki Kogyo Co., Ltd. under the conditions of a tube of Cu, a vertical goniometer and an X-ray tube voltage of 50 kV, in order to examine whether or not $\alpha$-$Si_3N_4$ had been turned to $\beta$-$Si_3N_4$ and whether or not there was a crystal constituted by a Yb element, an Mg element, an Si element, an O element and an N element in the grain boundary phase. A peak in an obtained X-ray diffraction chart was attributed with reference to PDF card data. A peak of $\beta$-$Si_3N_4$ was identified in each X-ray diffraction chart of each of the samples, and thereby it was confirmed that $\alpha$-$Si_3N_4$ used as a material had been turned to $\beta$-$Si_3N_4$.

In the X-ray diffraction charts of Samples 1, 2, 4, 13-18, peaks peculiar to $YbMgSi_2O_5N$ in addition to peaks peculiar to $\beta$-$Si_3N_4$ were identified (identification of $YbMgSi_2O_5N$ was performed using a PDF card 48-1634). In the X-ray diffraction chart of Sample N, a peak peculiar to $Yb_2Si_2O_7$ in addition to a peak peculiar to $\beta$-$Si_3N_4$ was identified. In the X-ray diffraction charts of Samples 3, 5-12, 19, 20 and Samples A-M, O, peaks peculiar to crystals of any YbMgSi compound were not identified other than peaks peculiar to $\beta$-$Si_3N_4$.

Figure 5:
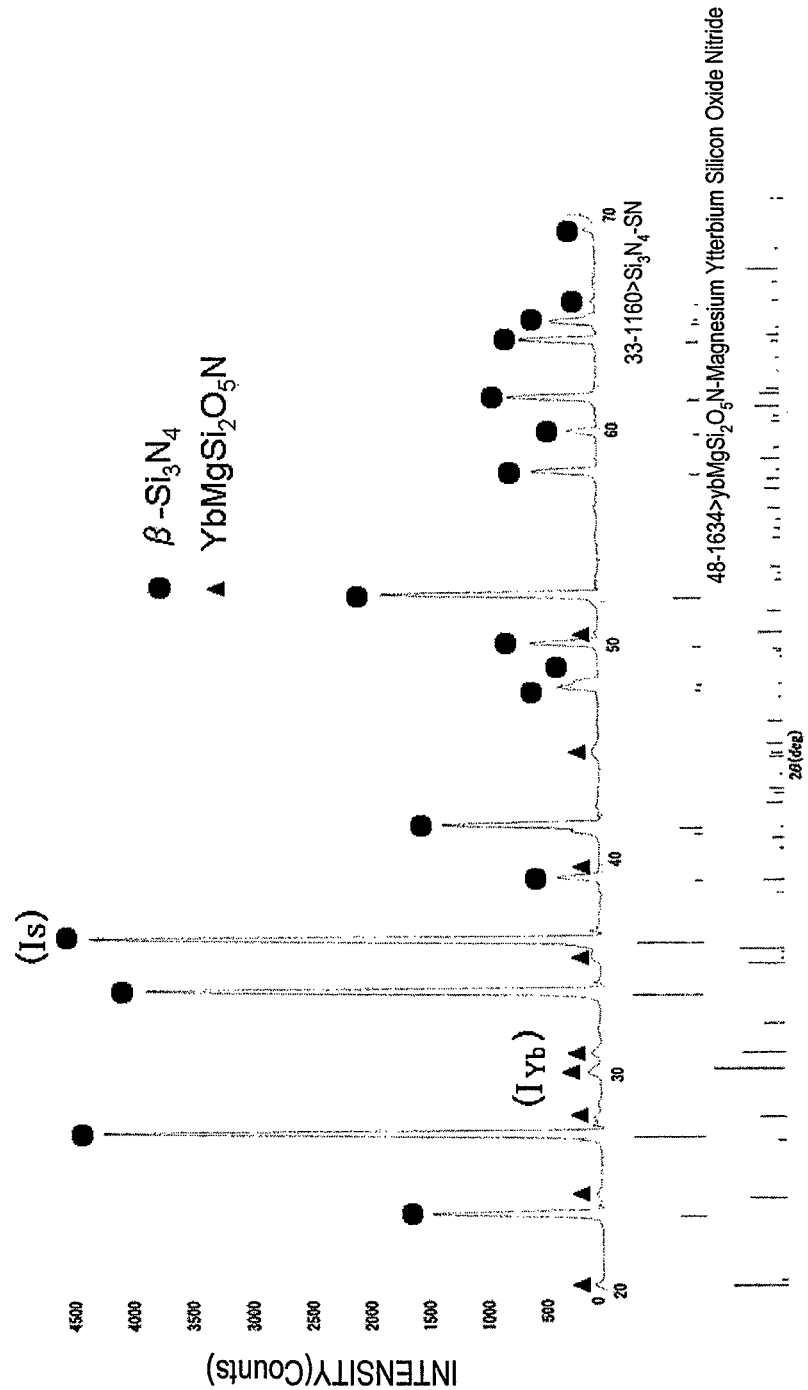
FIG. 5 is an X-ray diffraction chart of Sample 2 in an example.

A peak intensity ratio in the X-ray diffraction chart was obtained by obtaining an intensity ($I_{Yb}$) of a peak indicating a maximum intensity among peaks peculiar to $YbMgSi_2O_5N$ and an intensity ($I_s$) of a peak indicating a maximum intensity among peaks based on $\beta$-$Si_3N_4$ or sialon, in accordance with respective heights from base lines of the respective X-ray diffraction charts, and then performing calculation according to an equation $(I_{Yb}/I_s) \times 100\%$. For example, FIG. 5 shows the X-ray diffraction chart of Sample 2 in FIG. 4 (Table 2).

In this X-ray diffraction chart, a peak indicating a maximum intensity among peaks peculiar to $YbMgSi_2O_5N$ (peaks with ▲ in FIG. 5) was identified around $2\theta(deg)=30°$ with the intensity of ($I_{Yb}$), while a peak indicating a maximum intensity among peaks based on $\beta$-$Si_3N_4$ (peaks with ● in FIG. 5) was identified around $2\theta(deg)=36°$ with the intensity of ($I_s$). The peak intensity ratio was calculated based on the intensities of ($I_{Yb}$) and ($I_s$). The calculated peak intensity ratio of each insert is shown in FIG. 4 (Table 2).

Density of each of the samples was measured by the Archimedes method, and the measured density was divided by a theoretical density to obtain a theoretical density ratio. In each of all the samples in the scope of the present invention (the embodiments), the theoretical density ratio was sufficiently high (specifically 99.0 or higher) and the sintered body was densified without micropores remaining therein.

Measurement results except the theoretical density ratio are indicated in FIG. 4 (Table 2).

b) Next, an explanation will be provided on a performance test of each of the sample inserts.

(1) Abrasive Wear Resistance

Figure 6A:
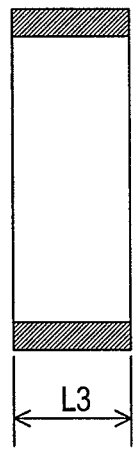
FIG. 6A is a transverse sectional view.
Figure 6B:
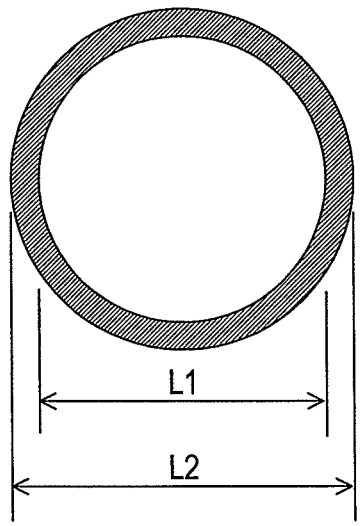
FIG. 6B is a vertical sectional view.
Figure 6C:
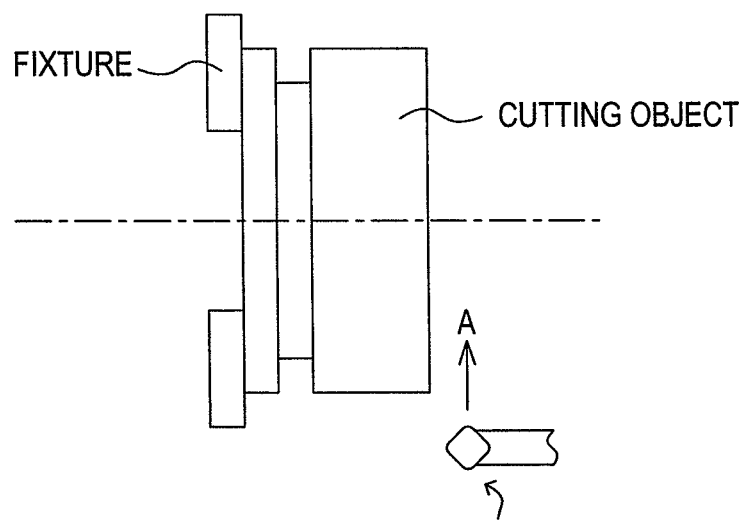
FIG. 6C is an explanatory view showing a cutting direction.

Each insert having a shape defined in SNGN120408 and a chamfer of 0.2 mm was used. As shown in FIG. 6, an FC200 with remaining cast sand on both end surfaces was selected as a cutting workpiece, and the insert was moved in a direction of an arrow A to perform cutting process.

Specifically, the cutting process was performed under the conditions of a cutting speed of 500 mm/min, a cutting depth of 1.5 mm, a feed rate of 0.2 mm/rev and dry cutting, and a maximum flank wear size was measured and indicated as an abrasive wear size (unit: mm).

In FIG. 6, L1 is 260 mm, L2 is 300 mm, L3 is 100 mm and a wall thickness is 20 mm.

The results are shown in FIG. 4 (Table 2).

(2) Breakage Resistance

Cutting process was performed using each insert having a shape defined in SNGN432 and a chamfer of 0.1 mm.

Specifically, an FC200 was selected as a cutting workpiece, and cutting process was performed under the conditions of a cutting speed of 150 mm/min, a cutting depth of 2.0 mm, a feed rate of 0.60 mm/rev at the beginning with an increase of 0.05 mm/rev per process path, and dry cutting. Breakage resistance was evaluated by a feed rate at which breakage occurred.

Figure 7:
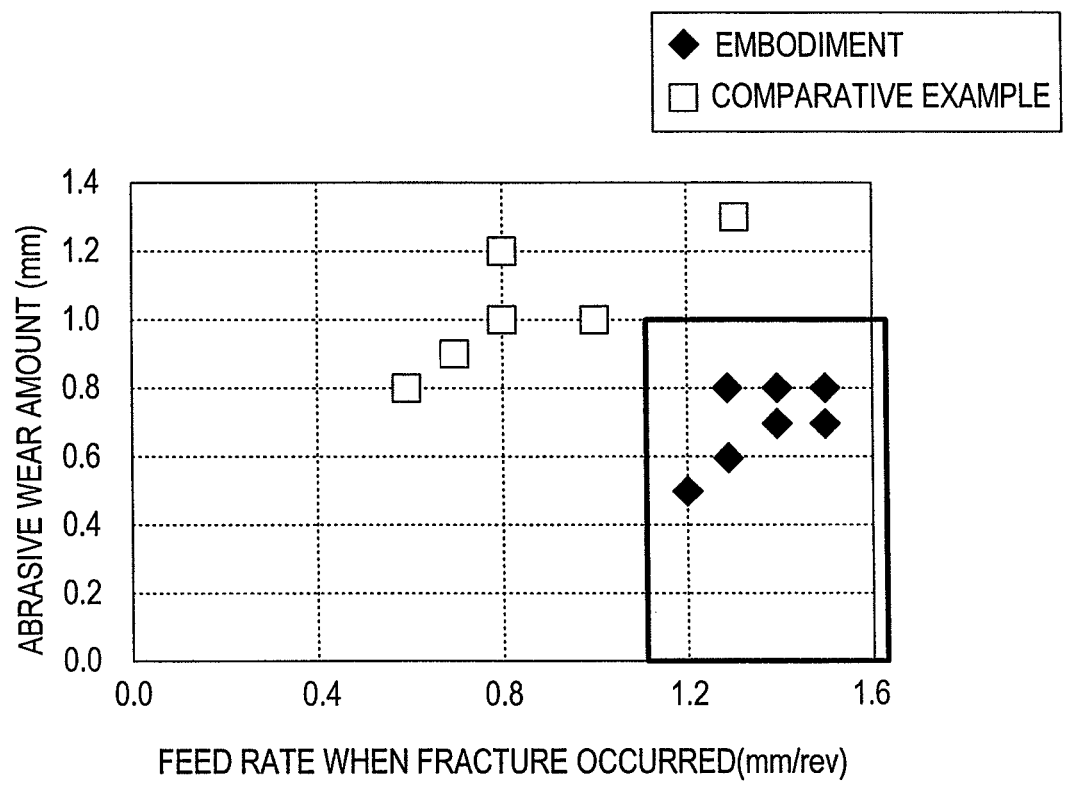
FIG. 7 is a graph showing experimental results.

The results are shown in FIG. 7 and FIG. 4 (Table 2).

As clearly shown in FIG. 7 and Table 2 of FIG. 4, each of the samples of the examples in the scope of the present invention exhibits a smaller abrasive wear size and also a higher feed rate at the time of breakage compared with samples of the comparative examples, and thus excels in both wear resistance and breakage resistance.

It is to be understood that the present invention should not be limited to the above-described embodiments or examples, but may be practiced in various forms without departing from the scope of the invention.

The invention claimed is:

1. An insert comprising:
   a silicon nitride sintered body, including
   $\beta$-$Si_3N_4$ as a main component;
   Mg; and
   a rare-earth element Re (Y, La, Ce, Er, Dy, Yb),
   a content of Mg in terms of MgO being 1.0-7.0 mol %, a content of Re in terms of an oxide thereof being 0.4-1.0 mol %, and a total content of Mg and Re being from 1.7 to less than 7.5 mol %,
   wherein the insert has a graded composition in which oxygen content increases from a surface of the sintered body toward an inside thereof such that 0.8-1.5 mass % of oxygen is contained in a region of less than 0.5 mm inside from the surface, 1.1-2.3 mass % of oxygen is contained in a region of 0.5 mm or more inside from the surface, and a difference in oxygen content between the regions is 0.1-1.0 mass %.

2. The insert as set forth in claim 1, wherein the rare-earth element Re is Yb, and wherein the content of Mg in terms of MgO is 1.0-5.5 mol %, a content of Yb in terms of $Yb_2O_3$ is 0.4-1.0 mol %, and a total content of Mg and Yb is from 1.7 to less than 6.0 mol %.

3. The insert as set forth in claim 1, wherein a thermal conductivity at room temperature is 45 W/m·K or more in an outer region with a depth of less than 1.0 mm from a surface and 40 W/m·K or more in an inner region with a depth of 1.0 mm or more from the surface.

4. The insert as set forth in claim 1, wherein a bending strength at room temperature (a three-point bending strength: JIS R1601) is 900 MPa or more.

5. The insert as set forth in claim 1, wherein crystals containing a Yb element, an Mg element, an Si element, an O element, and an N element are included in a grain boundary phase.

6. The insert as set forth in claim 5, wherein an intensity (IYb) of a peak indicating a maximum intensity among peaks based on $YbMgSi_2O_5N$ in the crystals is more than 0% to equal to 10% or less against an intensity (Is) of a peak indicating a maximum intensity among peaks based on silicon nitride or sialon in an X-ray diffraction chart of the insert of the silicon nitride sintered body.

7. A cutting tool comprising:

a holder; and an insert attached to the holder, the insert including:

$\beta$-$Si_3N_4$ as a main component;

Mg; and a rare-earth element Re (Y, La, Ce, Er, Dy, Yb), a content of Mg in terms of MgO being 1.0-7.0 mol %, a content of Re in terms of an oxide thereof being 0.4-1.0 mol %, and a total content of Mg and Re being from 1.7 to less than 7.5 mol %, wherein the insert has a graded composition in which oxygen content increases from a surface of the sintered body toward an inside thereof such that 0.8-1.5 mass% of oxygen is contained in a region of less than 0.5 mm inside from the surface, 1.1-2.3 mass% of oxygen is contained in a region of 0.5 mm or more inside from the surface, and a difference in oxygen content between the regions is 0.1-1.0 mass%.

* * * * *